United States Patent
Kramer et al.

(10) Patent No.: US 7,120,512 B2
(45) Date of Patent: Oct. 10, 2006

(54) METHOD AND A SYSTEM FOR SOLID FREEFORM FABRICATING USING NON-REACTIVE POWDER

(75) Inventors: Laura Kramer, Corvallis, OR (US); Vladek P Kasperchik, Corvallis, OR (US); Terry M. Lambright, Corvallis, OR (US); Melissa D. Boyd, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 100 days.

(21) Appl. No.: 10/648,122

(22) Filed: Aug. 25, 2003

(65) Prior Publication Data
US 2005/0049739 A1 Mar. 3, 2005

(51) Int. Cl.
*G06F 19/00* (2006.01)
(52) U.S. Cl. .................. 700/119; 700/98; 700/118; 700/198
(58) Field of Classification Search .................. 700/97, 700/98, 117, 118, 119, 182, 198, 120; 430/14, 430/15, 18, 22, 124; 156/273.1; 425/174.8; 264/113, 308, 401, 463

See application file for complete search history.

(56) References Cited

U.S. PATENT DOCUMENTS

| 5,738,817 | A |   | 4/1998  | Danforth et al. |         |
|-----------|---|---|---------|-----------------|---------|
| 5,900,207 | A |   | 5/1999  | Danforth et al. |         |
| 5,902,537 | A | * | 5/1999  | Almquist et al. | 264/308 |
| 6,100,007 | A | * | 8/2000  | Pang et al.     | 430/269 |
| 6,136,497 | A | * | 10/2000 | Melisaris et al.| 430/269 |
| 6,376,148 | B1| * | 4/2002  | Liu et al.      | 430/124 |
| 6,454,972 | B1|   | 9/2002  | Morisette et al.|         |
| 6,650,393 | B1| * | 11/2003 | Nishiguchi      | 349/156 |
| 2003/0173713 | A1 | * | 9/2003 | Huang       | 264/401 |
| 2004/0145088 | A1 | * | 7/2004 | Patel et al.| 264/308 |

* cited by examiner

*Primary Examiner*—Leo Picard
*Assistant Examiner*—Charles Kasenge

(57) ABSTRACT

A method for creating a three-dimensional solid freeform fabrication object with non-reactive powder includes spreading a non-reactive powder on a substrate, selectively dispensing a reactive resin onto the non-reactive powder forming a mixture of reactive resin and non-reactive powder, wherein the selective dispensing of the reactive resin defines the three-dimensional object, and curing the reactive resin thereby encapsulating the non-reactive powder.

20 Claims, 8 Drawing Sheets

METHOD AND A SYSTEM FOR SOLID FREEFORM FABRICATING USING NON-REACTIVE POWDER

BACKGROUND

Solid freeform fabrication (SFF) is a process whereby three-dimensional objects, for example, prototype parts, models, working tools, production parts, molds, and other articles are manufactured. Computer aided design (CAD) is commonly used to automate the design process. Using a suitable computer, an operator may design a three-dimensional article and then create that object by the use of a positionable ejection head that selectively emits a desired material. While many methods have been developed to manufacture SFF objects according to the above principles, two methods have traditionally been preferred for manufacturing SFF objects: powder/binder interaction to create a solid object, and the use of jetted curable photopolymers to create a solid object.

Powder/binder interaction forming methods include the selective deposition of a binder onto powder constituents. Once deposited, the powder constituents react with the binder to create a solid object. In many cases powder/binder interaction boils down to swelling of a polymer component of the powder in a solvent present in the binder. In order to incorporate the traditional powder and binder interaction method, both the binder and the powder must be finely tuned to chemically react when combined. This limits the types of powders and binders that may be used. Additionally, this method tends to result in porous final structures. Moreover, low dimensional accuracy may result from this method due to swelling of the powder constituents during the powder/binder interaction.

Jetted photopolymer methods include the selective deposition of both build and support material from a dispenser onto a substrate where the two materials subsequently solidify. While dimensional accuracy is improved by this method, jetted photopolymer methods are slower than methods that apply material in a bulk process. Additionally, the costs of jetted photopolymer machines are high because they require both a material dispenser and a material reservoir for each material dispensed. In these jetted photopolymer technologies, both the build and the support material must be jetted through the material dispensers.

SUMMARY

A method for creating a three-dimensional solid freeform fabrication object with non-reactive powder includes spreading a non-reactive powder on a substrate, selectively dispensing a reactive resin onto the non-reactive powder forming a mixture of reactive resin and non-reactive powder, wherein the selective dispensing of the reactive resin defines the three-dimensional object, and curing the reactive resin thereby encapsulating the non-reactive powder.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

A method and apparatus for jetting reactive materials for powder-based solid freeform fabrication is described herein. More specifically, a one or a two-part binder or resin may be jetted onto a wide variety of non-reactive powders and cured to create three-dimensional objects.

As used in this specification and in the appended claims, the term "binder" is meant to be understood broadly as any material used to bind separate particles together or facilitate adhesion to a surface. Additionally, the term "substrate" is meant to be understood as any build platform, removable material, or previously deposited reactive or powder material. A "build platform" is typically the rigid substrate that is used to support deposited material from an SFF apparatus. Similarly, the term "curing" is meant to refer to the process of solidifying a material to form a solid three-dimensional object.

In the following description, for purposes of explanation, numerous specific details are set forth in order to provide a thorough understanding of the present system and method for jetting reactive materials for powder-based solid freeform fabrication. It will be apparent, however, to one skilled in the art that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
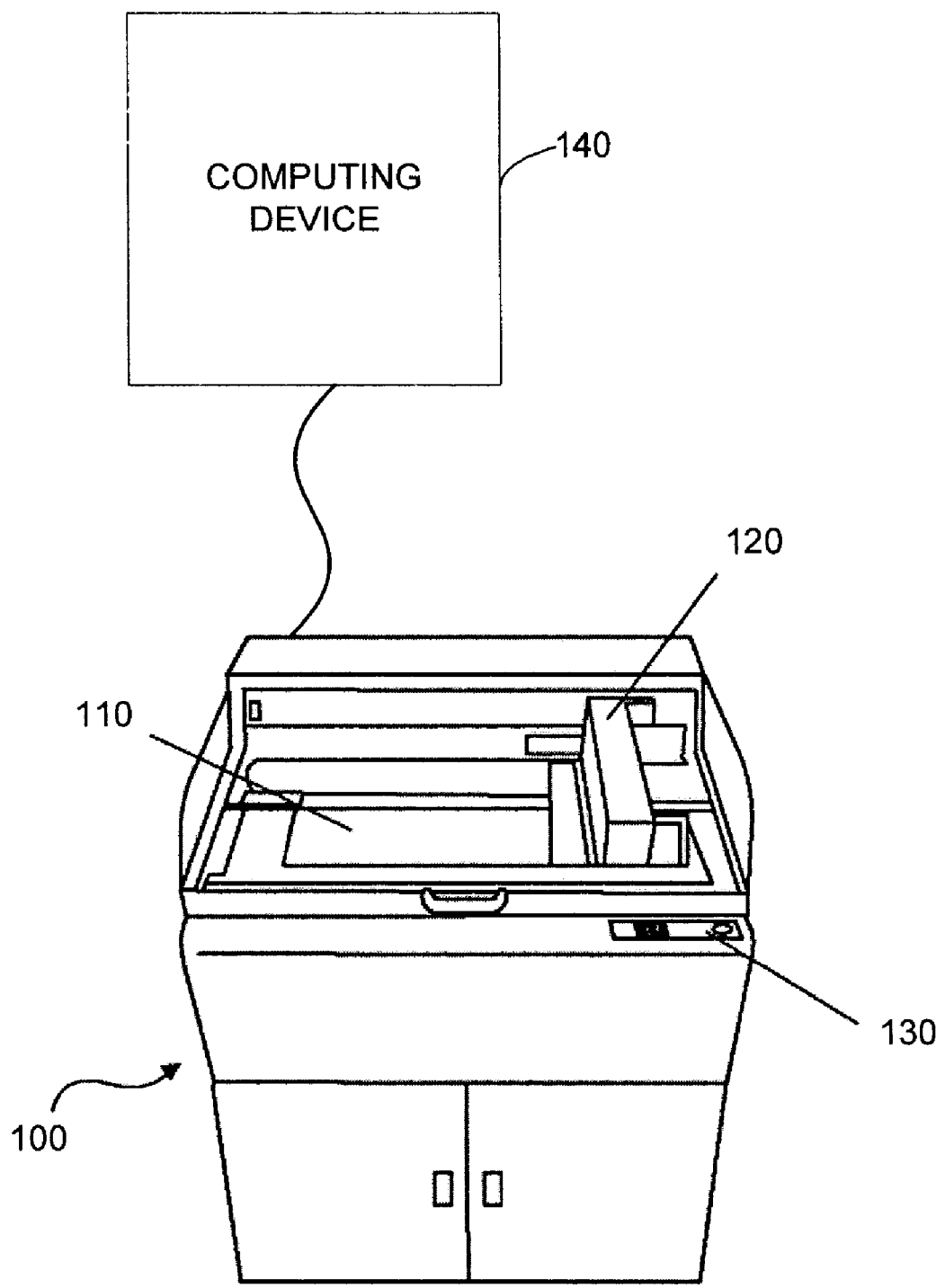
FIG. 1 is a perspective view of a solid freeform fabrication system that may be used to implement exemplary embodiments of the present system and method.

FIG. 1 illustrates a solid freeform fabrication system (100) that may incorporate the present method of jetting reactive materials for powder-based SFF. As shown in FIG. 1, a solid freeform fabrication system may include a fabrication bin (110), a moveable stage (120), and a display panel (130) including a number of controls and displays.

The fabrication bin (110) shown in FIG. 1 may be configured to receive and facilitate the building of a desired three-dimensional object on a substrate. The building of the desired three-dimensional object may require the spreading of a powder and the selective dispensing of a one or two-part binder. While the solid freeform fabrication system (100) illustrated in FIG. 1 is shown as a single, stand-alone, self-contained freeform fabrication system, the present powder based SFF system and methods may be incorporated into any freeform fabrication system that utilizes powder-based methods, regardless of the structure or configuration of the freeform fabrication system.

The moveable stage (120) of the solid freeform fabrication system (100) illustrated in FIG. 1 is a moveable material dispenser that may include any number of inkjet material dispensers configured to dispense liquid binder material. The moveable stage (120) may be controlled by a computing device (140) and may be controllably moved by, for example, a shaft system, a belt system, a chain system, etc. As the moveable stage (120) operates, the display panel (130) may inform a user of operating conditions as well as provide the user with a user interface. As a desired three-dimensional object is formed, a computing device may controllably position the moveable stage (120) and direct one or more of the dispensers to controllably dispense liquid binder material at predetermined locations within the fabrication bin (110) thereby forming a desired three-dimensional object. The inkjet material dispensers used by the solid freeform fabrication system (100) may be any type of inkjet dispenser configured to perform the present method including, but in no way limited to thermally actuated inkjet dispensers, mechanically actuated inkjet dispensers, electrostatically actuated inkjet dispensers, magnetically actuated dispensers, piezoelectrically actuated dispensers, continuous inkjet dispensers, etc. Additionally, the ink-jet printhead dispenser can be heated to assist in dispensing viscous chemical compositions. For example, the ink-jet printhead dispenser may be heated up to about 200° C., and preferably in the range of 70 to 120° C. A more demonstrative cross-sectional view of the SFF apparatus of FIG. 1 is presented in FIG. 2.

Figure 2:
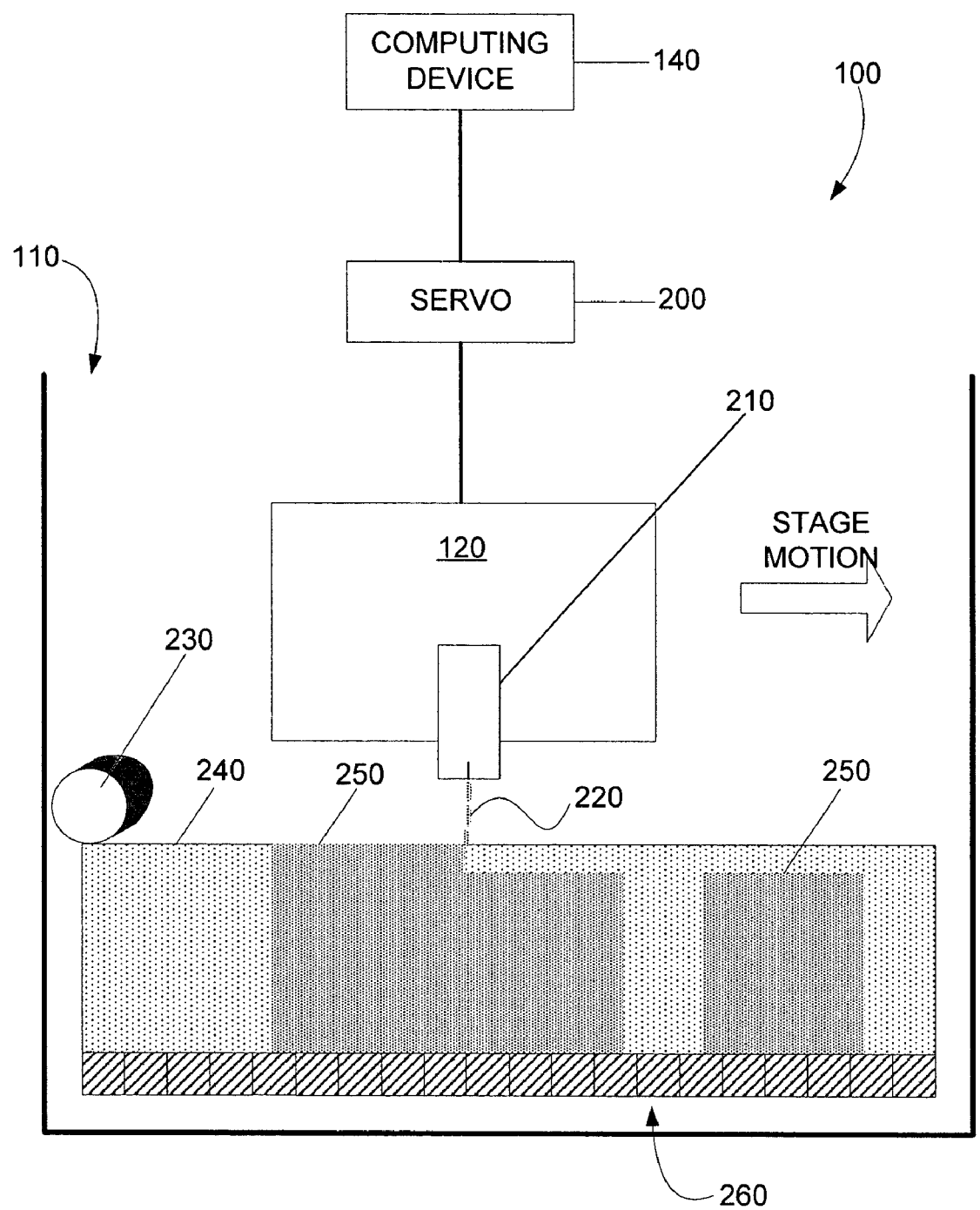
FIG. 2 is a cross-sectional view of a solid freeform fabrication system that may be used to implement exemplary embodiments of the present system and method.

As shown in FIG. 2, the computing device (140) may be communicatively coupled to a servo mechanism (200). The computing device (140) may communicate commands to the servo mechanism (200) causing it to selectively position the moveable stage (120). One or more inkjet dispensers (210) may be coupled to the moveable stage (120) and to a number of material reservoirs (not shown). Once positioned by the servo mechanism (200), the inkjet dispenser (210) may eject a reactive binder (220) supplied by the material reservoir. The reactive binder (220) that is stored in the material reservoir (not shown) and supplied to the inkjet dispenser (210) to be dispensed is selected with a "jettable" viscosity (<70 cps) at an operating temperature below approximately 200 degrees Celsius. In an additional exemplary embodiment, the viscosity of the reactive binders is selected to be below 20 cps at an operating temperature below 100 degrees Celsius. Additionally, the reactive binder (220) is also selected to have a fairly fast reaction rate (gelling within seconds/minutes) when activated or mixed. Chemistries that may meet these requirements include, but are in no way limited to, epoxies, urethanes, acrylates, silicones, polyelectrolytes, and their derivatives.

FIG. 2 also illustrates the components of the present system that may be used to receive the reactive binder (220) and aid in the formation of a desired three-dimensional object. As shown in FIG. 2, the fabrication bin (110) of the solid freeform fabrication system (100) may include a substrate (260) having a non-reactive powder (240) disposed thereon. The non-reactive powder (240) may be dispensed on the substrate (260) in bulk quantities from a powder reservoir (not shown) and planarized to a desired thickness with the use of a mechanical roller (230). Control of the mechanical roller (230) may be performed by the servo mechanism (200) to controllably deposit and planarize the non-reactive powder (240) on the substrate (260). The non-reactive powder (240) dispensed on the substrate may include, but is in no way limited to silica particles, glass spheres, metal powders, polymer powders, ceramic powders, magnetic powders, or any non-reactive powder that may act as a filler material when bound by reactive binder (220). Moreover, the non-reactive powder (240) may be any powder or particles wherein the reactive binder (220) is able to wet the surface of the non-reactive powder particles (240) and couple or bond the non-reactive powder particles to the reactive binder without causing swelling or dissolving of the non-reactive powder. A chemical reaction may occur on the surface of the reactive powder particles to further couple and/or bond the reactive powder to the reactive binder. Furthermore, the non-reactive powder particles may be pretreated with adhesion promoter to better couple and/or bond to the reactive binder when dispensed.

Once the reactive binder (220) is dispensed in the layer of non-reactive powder (240), a mixture (250) of reactive binder (220) and non-reactive powder (240) exists on the substrate (260) that defines a desired three-dimensional object. The system and method for using the solid freeform fabrication system (100) illustrated in FIG. 2 will now be described in detail below with reference to FIG. 3 through FIG. 4D.

Exemplary Implementation and Operation

Figure 3:
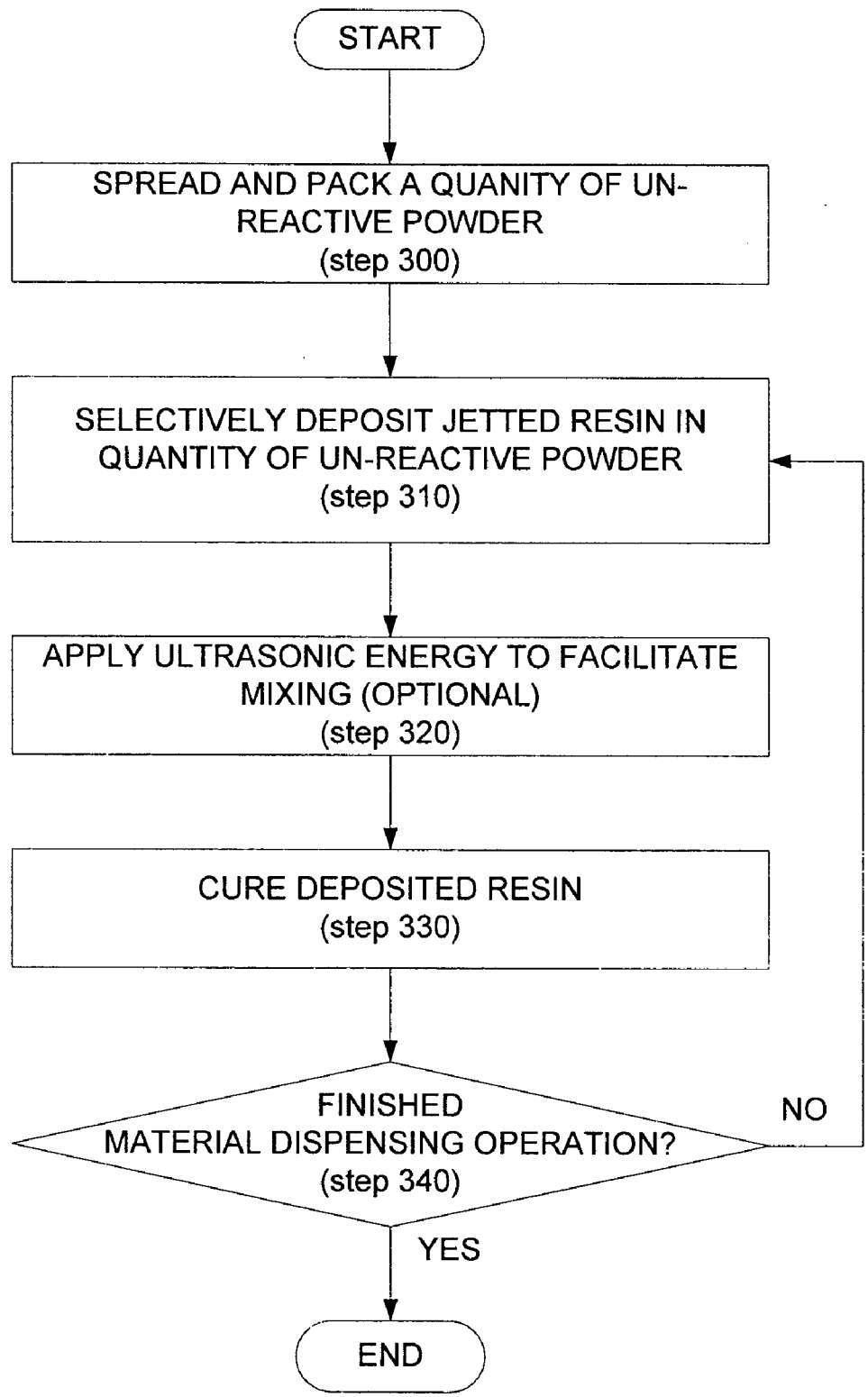
FIG. 3 is a flow chart illustrating a method for performing the present method using a one-part reactive material according to one exemplary embodiment.

FIG. 3 is a flow chart illustrating a present method for operating the solid freeform fabrication system (100; FIG. 2) illustrated in FIG. 2 incorporating a one-part reactive resin binder according to one exemplary embodiment. The one-part binder used in the present system and method may include any binder that may be stored in a reservoir, ejected by an inkjet dispenser, and cured by any means other than the addition of a second material. For ease of explanation only, the present system and method will be described within the context of incorporating a one-part binder in the form of a UV curable resin. The resin may be jetted into a quantity of non-reactive powder (240) and subsequently cured due to the application of UV radiation. As illustrated in FIG. 3, the present method may begin by spreading and packing a quantity of non-reactive powder in the fabrication bin (step 300). Once the quantity of powder has been spread and packed as necessary (step 300), the SFF apparatus selectively deposits resin into the newly spread layer of non-reactive powder (step 310). When the layer of resin has been jetted into the non-reactive powder, the SFF may optionally apply ultrasonic energy (step 320) to the resin/powder mixture (250; FIG. 2) to facilitate dispersion of the jetted resin in the powder. When the optional ultrasonic energy has been applied, the SFF apparatus cures the deposited resin (step 340) through the application of ultraviolet (UV) radiation. Alternatively, the resin may be only partially cured after each layer to aid in its adhesion to subsequent layers. According to this alternative embodiment, only after several passes/layers have been completed would the curing be completed. If after the application of UV radiation (step 330) an operator or computing device determines that the material dispensing operation is complete (YES, step 340) to form the desired three-dimensional object, no further drops of resin are fired. If, however, the material dispensing operation is not complete (NO, step 340), as determined by the operator or computing device, the SFF apparatus may again spread and pack a quantity of non-reactive powder (step 300) and the process is performed again. Each of the above-mentioned steps of FIG. 3 will now be explained in detail with reference to FIGS. 4A through 4D.

Figure 4A:
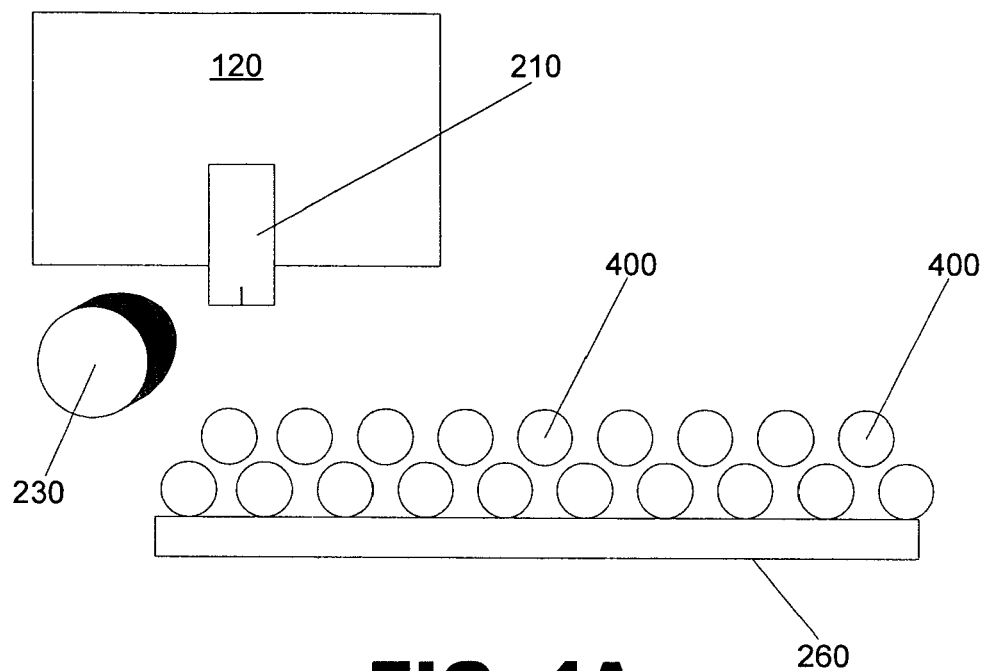
FIG. 4A is a cross-sectional view illustrating a powder that may be used by the present method according to one exemplary embodiment.

As shown in the flow chart of FIG. 3, the present method begins by spreading and packing a layer of non-reactive powder (step 300). FIG. 4A illustrates how the mechanical roller (230) may spread and pack a thin layer of non-reactive powder (400) on the substrate (260). First, a predetermined amount of non-reactive powder is deposited on the substrate from a powder reservoir (not shown). Once deposited, the mechanical roller (230) packs and spreads a quantity of the non-reactive powder. The amount of non-reactive powder (400) that remains on the substrate after the mechanical roller (230) has spread and packed a thin layer corresponds to the distance between the mechanical roller (230) and the substrate (260) if no material deposition operations have been performed. Similarly, if a number of material deposition operations have been performed, the amount of non-reactive powder (400) that remains on the substrate after a roller operation corresponds to the distance between the mechanical roller (230) when it performs its spreading and packing operation and the previously cured resin/powder mixture (250; FIG. 2). The amount of non-reactive powder deposited by the mechanical roller may be adjusted by the servo mechanism (200; FIG. 2) and optimized to correspond to the resin ejection rate of the inkjet dispenser (210).

Figure 4B:
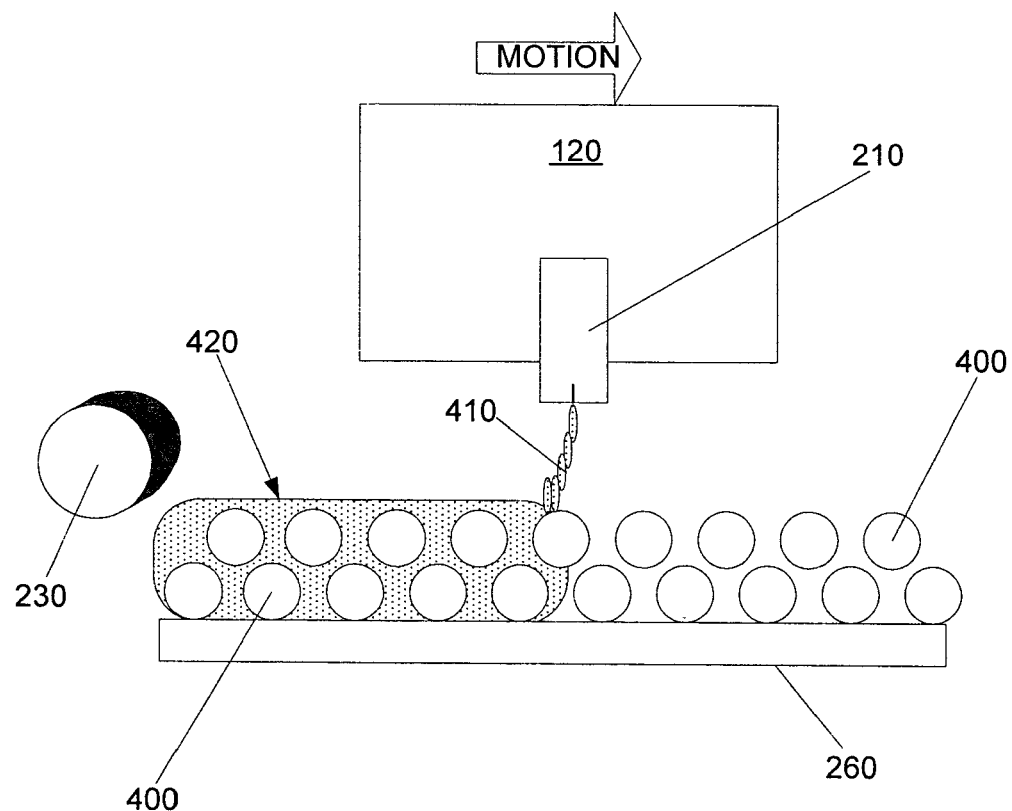
FIG. 4B is a cross-sectional view showing the deposition of a one-part reactive material according to one exemplary embodiment.

Once a layer of non-reactive powder (400) has been spread and packed by the mechanical roller (step 300; FIG. 3), the inkjet dispenser (210) may selectively deposit a quantity of jetted resin (step 310). As shown in FIG. 4B, the moveable stage (120) and consequently the inkjet dispenser (210) may be controllably positioned by the computing device (140; FIG. 2) and the servo mechanism (200) adjacent to the non-reactive powder (400). When in a desired location, as directed by a CAD program, the inkjet dispenser (210) is actuated to dispense a pre-determined quantity of the one-part reactive resin (410).

As is shown in FIG. 4B, when the one-part reactive resin (410) is dispensed by the inkjet dispenser (210) onto the layer of non-reactive powder (400), the one-part reactive resin disperses around and wets the surface of the non-reactive powder (400). This mixture (420) of reactive resin (410) and non-reactive powder (400) defines the cross-section of the desired three-dimensional object. The mixture (420) of one-part reactive resin (410) and non-reactive powder (400) avoids a number of dimensional accuracy issues that arise in systems where the powder and the resin completely react with each other. According to the present system and method, dimensional accuracy of the desired three-dimensional object is preserved because the non-reactive powder (400) does not dissolve, swell or deform in the presence of the one-part reactive resin (410). When sufficient one-part reactive resin (410) has been deposited on a layer of non-reactive powder (400) to wet a designated portion of the non-reactive powder, the moveable stage (120) is translated to selectively deposit one-part reactive resin (410) onto other areas of the non-reactive powder as indicated by the "motion" arrow.

The strength of the three-dimensional object being created by the present system and method may be affected by the amount of "interaction" (or wetting) that occurs between the one-part reactive resin (410) and the non-reactive powder (400). The interaction of the two materials (as well as wetting of the surface of non-reactive powder with reactive resin) may in turn be dependent upon a number of factors including, but in no way limited to, the viscosity of the one-part reactive resin (410). As shown in FIG. 3, an optional step may be performed of applying ultrasonic energy to the mixture (420) of one-part reactive resin (410) and non-reactive powder (step 320; FIG. 3). An ultrasonic transducer (not shown) or other similar element may form a part of the SFF apparatus (100) to provide the ultrasonic energy. The application of ultrasonic energy will facilitate the interaction of the two materials.

Similarly, the viscosity of the one-part reactive resin may be decreased by increasing the temperature of the inkjet dispenser (210). The ability to control the temperature of the inkjet dispenser (210) allows for the incorporation of more viscous higher molecular weight fluids which can provide for more desirable mechanical properties of the resulting three-dimensional object upon cooling. However, the temperature of the inkjet dispenser (210) should not exceed the vaporization temperature, decomposition temperature, or thermal activation temperature of the resin.

Once the mixture (420) of one-part reactive resin (410) and non-reactive powder (400) has sufficiently "interacted," the one-part reactive resin may be cured through the application of ultraviolet (UV) or other radiation energy (step 330; FIG. 3). When UV (or other) radiation energy (440) is applied to the one-part reactive resin (410), the added energy initiates polymerization, resulting in rapid curing of the one-part reactive resin (410). As the one-part reactive resin (410) cures, the reaction is only performed in the liquid phase of the one-part reactive resin (410) and not in the non-reactive powder (400). As the one-part reactive resin (410) cures, the cured resin encapsulates the non-reactive powder (400) to form a resin/powder composite matrix (450).

Figure 4C:
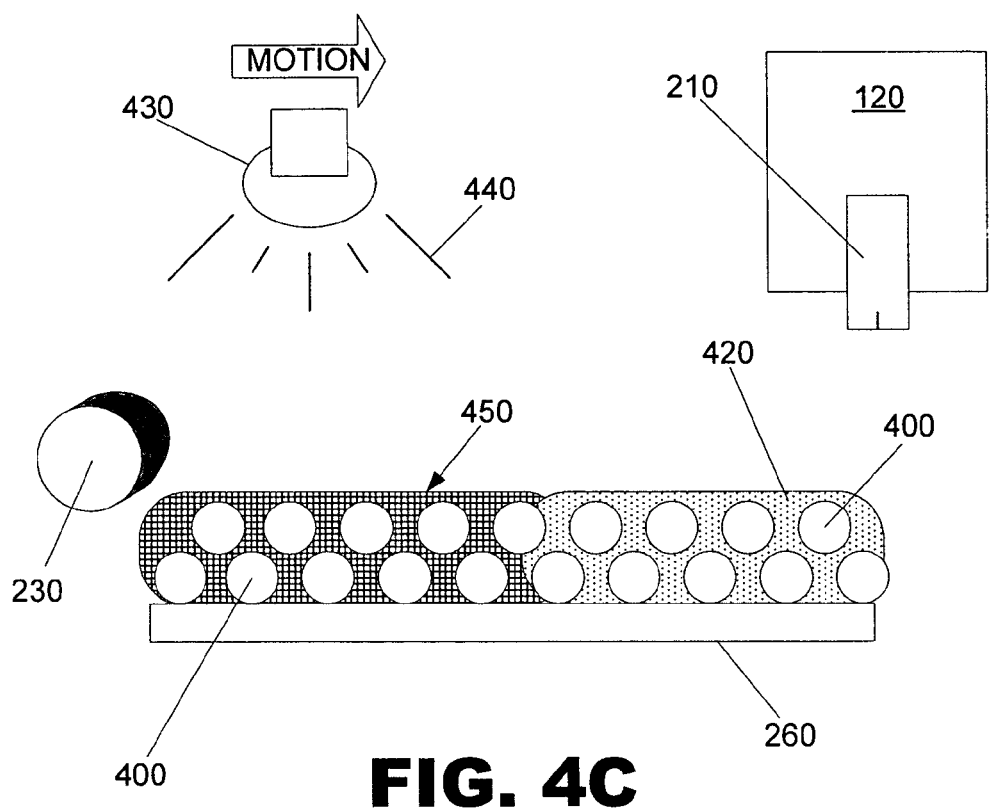
FIG. 4C is a cross-sectional view showing the application of ultraviolet (UV) rays to a one-part reactive system according to one exemplary embodiment.

The UV radiation energy (440) may be supplied to one or multiple layers of the mixture (420) by a UV radiation applicator (430). The UV radiation applicator may be any device configured to apply ultraviolet (UV) or other radiation energy sufficient to initiate polymerization in the one-part reactive resin (410). As shown in FIG. 4C, the radiation applicator (430) may be a separate light exposer or scanning unit configured to flood expose all or selective portions of deposited one-part reactive resin (410) after it has been deposited. Alternatively, the radiation applicator (430) may be coupled to the moveable stage (120) as a scanning unit. Moreover, the polymerization and thus the rapid curing of the one-part reactive resin may be further facilitated by the addition of thermal energy or any additive capable of increasing the curing process including, but in no way limited to, catalysts.

Figure 4D:
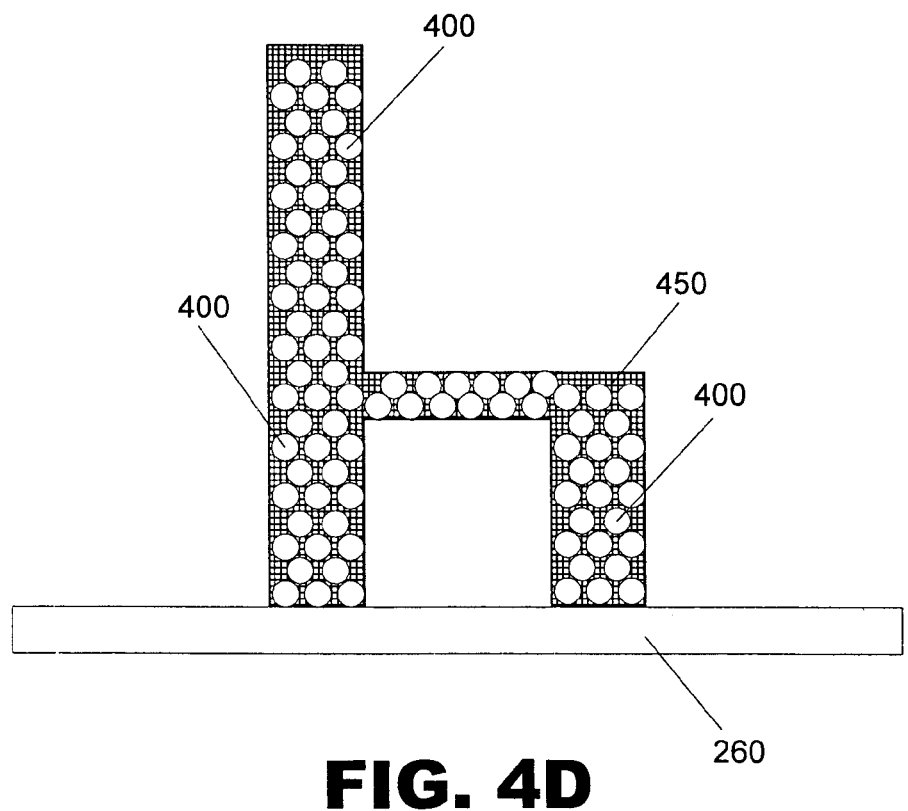
FIG. 4D is a cross-sectional view illustrating an object formed by the present method with the unbound powder removed according to one exemplary embodiment.

Once a layer of the mixture (420) of one-part reactive resin (410) and non-reactive powder (400) has sufficiently "interacted," the computing device (140; FIG. 2) will determine whether the solid freeform fabrication system (100; FIG. 2) has finished the material dispensing operation (step 340; FIG. 3) defining a desired three-dimensional object. If the requisite layers of resin/powder composite matrix (450) have been formed to construct a desired three-dimensional object (460; FIG. 4D), the computing device (140; FIG. 2) will determine that the material dispensing operation is complete (YES, step 340) and the solid freeform fabrication system (100; FIG. 2) will end its material dispensing operation. If, however, the computing device determines that the entire resin/powder composite matrix (450) has not been formed (NO, step 340), the solid freeform fabrication system (100; FIG. 2) spreads and packs another layer of non-reactive powder (step 300) and the process begins again.

Additionally, a number of additives may be included in either the one-part reactive resin (410) or the non-reactive powder (400). In order to incorporate color in the three-dimensional object (460; FIG. 4D) being formed, the one-part reactive resin (410) may be dyed to a desired color. To provide the solid freeform fabrication system (100; FIG. 2) with the ability to produce a full range of colors, three or four separate reservoirs may be coupled to the inkjet dispenser (210). The three or four separate reservoirs may contain a quantity of one-part reactive resin (410) dyed cyan, yellow, magenta, and possibly clear or black. Additionally the present system and method may be performed with an inkjet dispenser (210) having any number of separate reservoirs containing any number of dyed reactive resins (410).

Similarly, in order to increase the mechanical properties of the three-dimensional object (460; FIG. 4D), coupling agents maybe added to the one-part reactive resin (410) or the non-reactive powder (400). Coupling agents that may be used to increase the mechanical properties of the three-dimensional object include any material that may be used to chemically link the non-reactive powder (400) and the one-part reactive resin (410) to each other including, but in no way limited to, charged groups on the powder surface capable of interacting with a jetted polyelectrolyte binder or silane coupling agents capable of linking glass, silicate, alumino-silicate, metal oxide and/or many metal powders to a polymeric binder.

Incorporation of the present system and method provides better three-dimensional accuracy than traditional methods since the one-part reactive resin (410) and the reactive powder (400) do not interact during the curing process. More specifically, because the reaction in the present system and method only occurs in the liquid binder, there is no swelling, dissolving, or re-deposition of the constituents when forming the desired three-dimensional object. This lack of swelling and dissolving results in improved mechanical properties, a reduction in porosity within the formed object, and an increased dimensional accuracy of the formed object.

Alternative Embodiments

Figure 5:
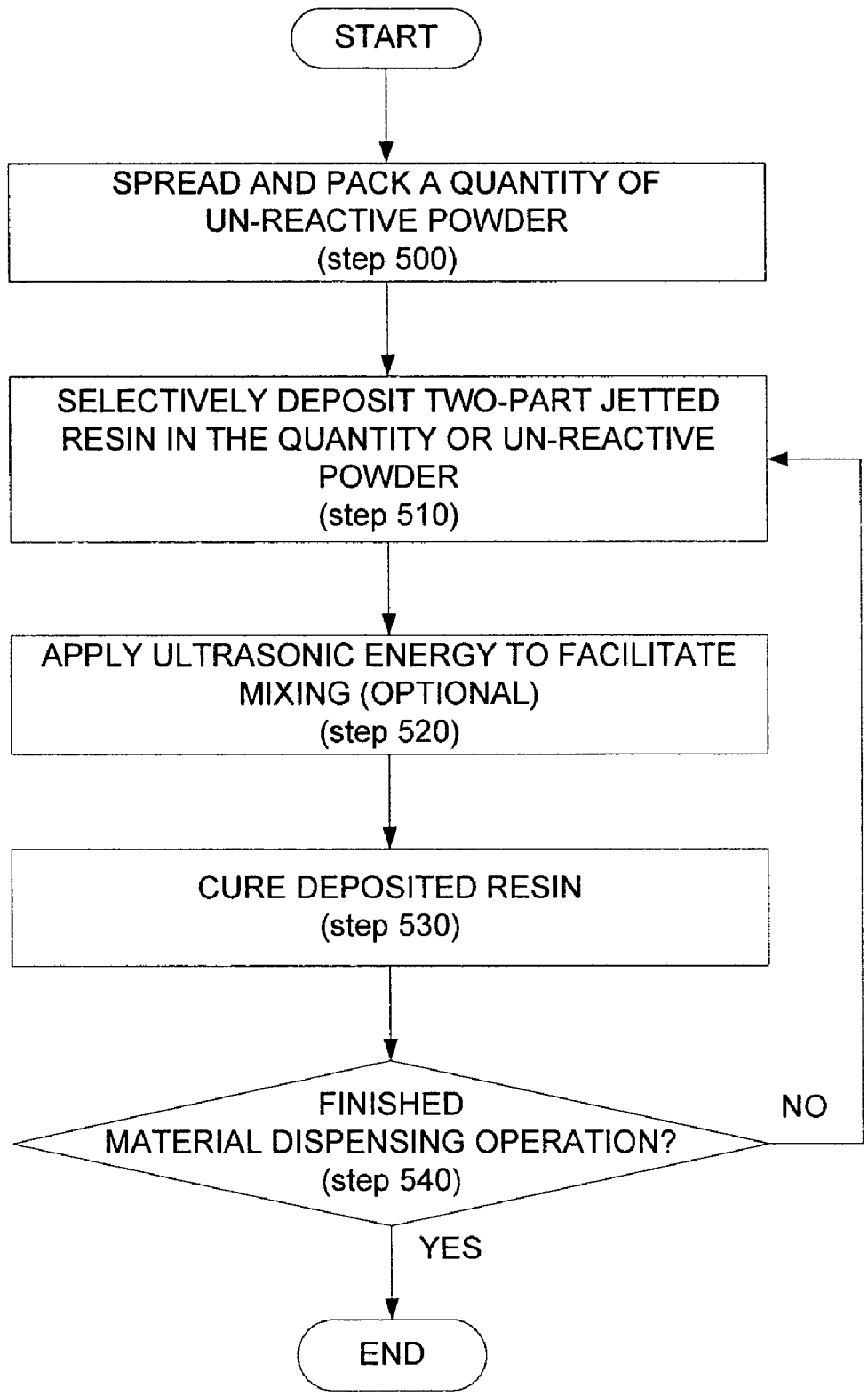
FIG. 5 is a flow chart illustrating a method for performing the present method using a two-part reactive material according to one exemplary embodiment.

FIG. 5 illustrates a method for performing the present SFF method and system according to an exemplary alternative embodiment that incorporates a two-part resin material. While the embodiment illustrated in FIG. 5 is described, for ease of explanation only, in the context of an SFF method and system incorporating a two-part resin material, the present system and method is in no way limited to a two-part resin material and may be practiced with any number of resin materials.

According to the flow chart illustrated in FIG. 5, the exemplary method begins with the spreading and packing of a quantity of non-reactive powder (step 500). Once the non-reactive powder has been spread (step 500), an inkjet dispenser selectively deposits two-part jetted resin (step 510) on the non-reactive powder. An optional step of applying ultrasonic energy to facilitate the interaction of the jetted resins and the non-reactive powder (step 520) may also be performed prior to or during the curing of the deposited resin (step 530). Similar to the method illustrated above in FIG. 3, once the deposited resin is cured (step 530) a computing device may determine whether the SFF apparatus has finished a material dispensing operation. If so (YES, step 540), the SFF system ceases to selectively dispense the two-part jetted resin. If, however, the computing device determines that the SFF system has not finished its material dispensing operation (NO, step 540), the apparatus again spreads and packs a quantity of non-reactive powder. The process illustrated in FIG. 5 will now be explained in greater detail with reference to FIG. 6A through FIG. 6D.

Figure 6A:
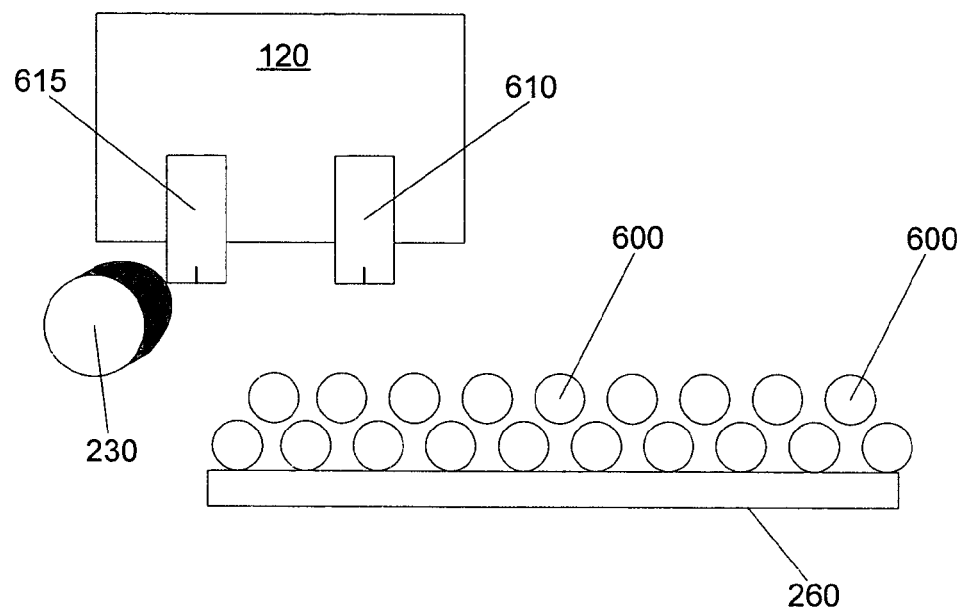
FIG. 6A is a cross-sectional view illustrating a powder that may be used by the present method according to one exemplary embodiment.

As shown in FIG. 5, an alternative method for forming a desired three-dimensional object begins with a mechanical roller (230; FIG. 6A) spreading and packing a quantity of non-reactive powder on a substrate (step 500). As shown in FIG. 6A, the mechanical roller (230) may spread and pack varying quantities of non-reactive powder (600) on a substrate (260) or a previously deposited resin/powder mixture as explained above.

Figure 6B:
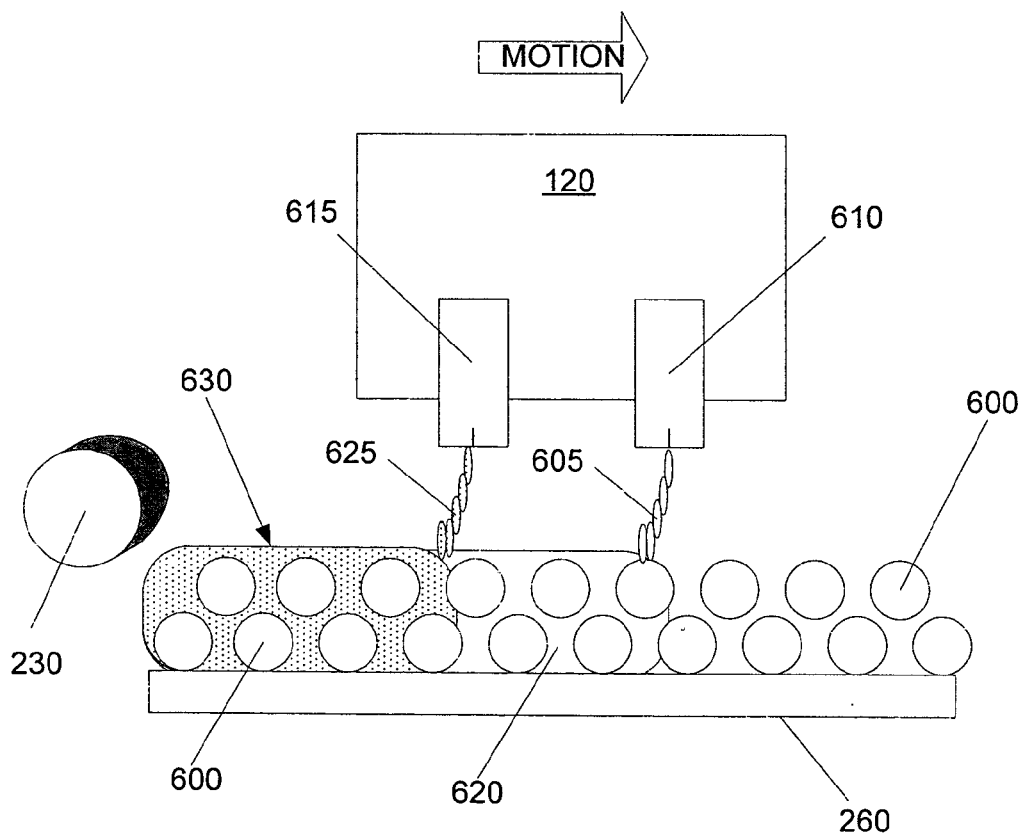
FIG. 6B is a cross-sectional view illustrating the deposition of a two-part reactive material according to one exemplary embodiment.

Once a quantity of non-reactive powder (600) has been spread and packed on the substrate (260), a moveable stage (120) may selectively deposit a two-part jetted resin onto the non-reactive powder (step 510; FIG. 5). As shown in FIG. 6A, the moveable stage (120) may include a plurality of inkjet dispensers (610, 615); one for each part of the two-part jetted resin. Each component (605, 625) of the two-part jetted resin may either be delivered through a separate channel in a single print head, or through separate print heads. FIG. 6B further illustrates the dispensing of the two-part jetted resin. As shown, the plurality of inkjet dispensers (610, 615) may each dispense a single component (605, 625) of the two-part resin (630) onto the non-reactive powder (600). Alternatively, a single inkjet dispenser may have a plurality of dispensing orifices, each configured to dispense one component (605, 625) of the two-part resin (630).

FIG. 6B illustrates the two components (605, 625) of the two-part resin being selectively applied to the non-reactive powder (600) simultaneously within each layer to build up a three-dimensional object. However, the two components (605, 625) of the two-part resin (630) may be applied to the non-reactive powder (600) in a number of different ways including, but in no way limited to, applying the two components in alternating layers of non-reactive powder (600). The two-part resin (630) may comprise two components that react upon contact such as a two-part epoxy resin, a two-part polyelectrolyte system, or a two-part UV curable acrylate. Regardless of the method of dispensing the two components (605, 625) of the two-part resin (630), increasing the level of mixing between the two components (605, 625) and between the components and the non-reactive powder (600) improves the strength of the resulting three-dimensional object.

Once the two-part jetted resin has been deposited (step 510; FIG. 5), ultrasonic energy or another appropriate method may be employed to facilitate the mixing of the two components (605, 625) of the two-part jetted resin (step 530). The appropriate method for facilitating the mixing will depend on the properties of the two components (605, 625) including, but in no way limited to, their respective viscosities, their miscibility, and their reaction rate when mixed.

Figure 6C:
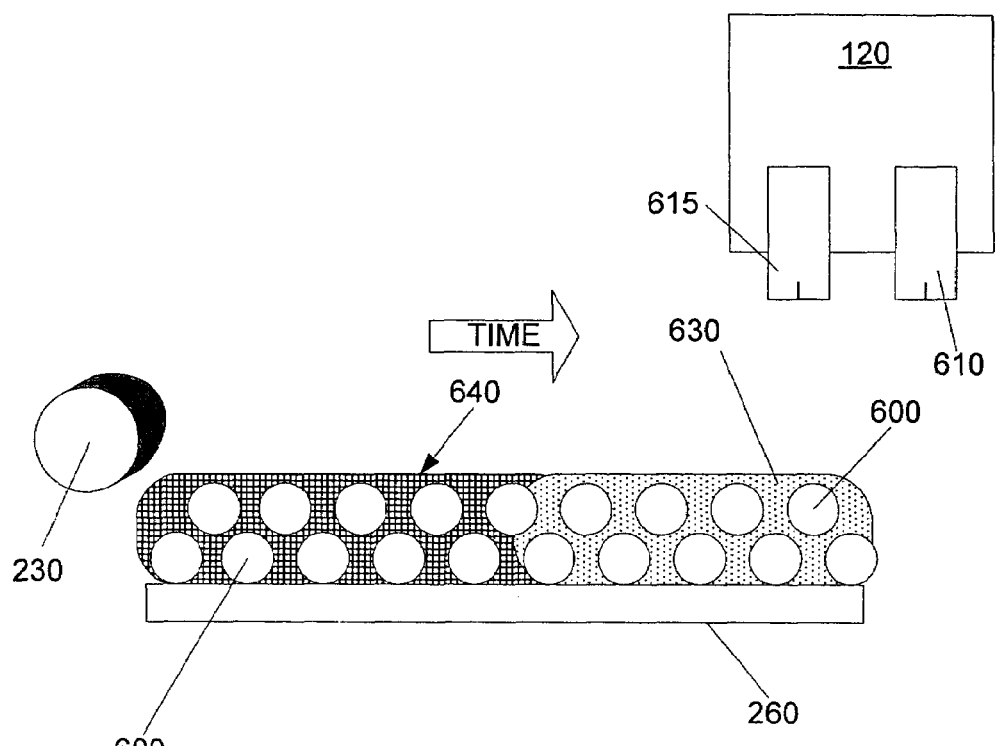
FIG. 6C is a cross-sectional view illustrating an alternative method for dispensing a two-part reactive material according to one exemplary embodiment.

Once mixed, the two components (605, 625) of the two-part jetted resin (630) are allowed to at least partially cure (step 330) prior to the spreading and packing of an additional layer of non-reactive powder (step 300). The two components (605, 625) are chosen to have fairly fast reaction rates (curing within seconds) allowing for rapid production of subsequent layers of the desired three-dimensional object. The curing of the two-part jetted resin may be enhanced by the addition of UV radiation energy, thermal energy, or any additive capable of increasing the curing process including, but in no way limited to, catalysts. As shown in FIG. 6C, as time passes, indicated by the arrow, the two-part jetted resin (630) may cure and encapsulate the non-reactive powder (600) forming a resin/powder composite matrix (640).

Figure 6D:
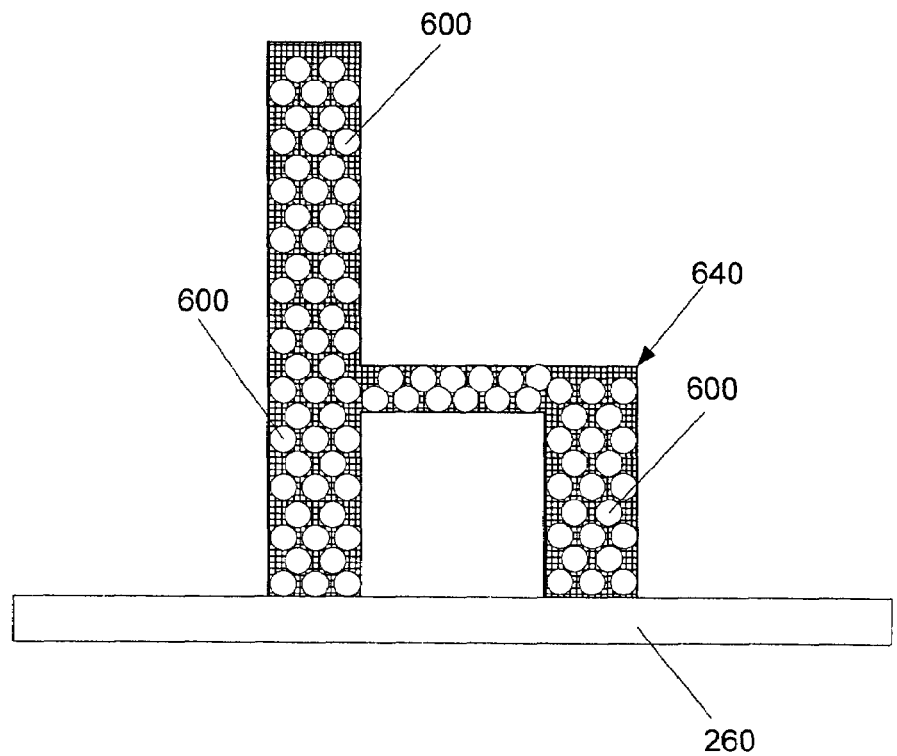
FIG. 6D is a cross sectional view illustrating an object formed by the present method with the unbound powder removed according to one exemplary embodiment.

During and/or after the curing of the deposited resin (step 530), the computing device may determine whether or not the solid freeform fabrication system (100; FIG. 2) has finished the material dispensing operation (step 540). If the requisite layers of resin/powder composite matrix (640) have been formed to construct a desired three-dimensional object (650) as shown in FIG. 6D, the computing device (140; FIG. 2) will determine that the material dispensing operation is complete (YES, step 540) and the solid freeform fabrication system (100; FIG. 2) will end its material dispensing operation and the unbound powder will be removed. If, however, the computing device determines that the entire resin/powder composite matrix (640) has not been formed (NO, step 540), the solid freeform fabrication system (100; FIG. 2) spreads and packs another quantity of non-reactive powder (step 500) and the process begins again.

Similar to the embodiment illustrated in FIG. 3, the alternative embodiment illustrated in FIG. 5 may be configured to incorporate color in the three-dimensional object (650; FIG. 6D) being formed. However, according to the exemplary alternative embodiment illustrated in FIG. 5, one or both components (605, 625) of the two-part jetted resin (630) may be dyed to one or more desired colors. Additionally, coupling agents maybe added to the two-part jetted resin (630) or the non-reactive powder (400) used in the alternative embodiment to increase the mechanical properties of the resulting three dimensional object.

The two-part jetted resin (630) illustrated above may generally be divided into a reactive build material and a curing agent or radiation initiator. The two-part jetted resin may include, but is in no way limited to, a two-part reactive resin or a two-part UV curable resin. Exemplary embodiments of material choices for the two-part jetted resin are illustrated below.

Two-Part Reactive Resin

In accordance with one exemplary embodiment, the reactive build material of the two-part reactive resin may be an epoxy and the curing agent of the two-part reactive resin may be a substance which reacts with the epoxy group to open its epoxide ring structure(s). Examples of functional groups capable of reacting with an epoxide ring in this manner are amino groups, hydroxyl groups, and carboxyl groups. In one embodiment, the reactive build material may be an epoxy and the curing agent may include molecules containing four active hydrogen atoms, which react with the epoxy to form a setting composition. Moreover, at least six or even eight or more active hydrogen atoms can be present. Covalent cross-linking between epoxy molecules of the curing agent can form solid three-dimensional objects having both hard and strong mechanical properties. A bisphenol-containing epoxy resin can also be used as the reactive build material with an amine as the curing agent. Some typical amine curing agents that can be used include tetraethylene pentamine, triethylene tetramine, polyethylene polyamines, diethylene triamine, 2,2,4 trimethyl-1,6 hexanediamine, and aliphatic amines. Classes of curing agents include aliphatic amines, cycloaliphatic amines, aromatic amines, polyamines, oligoamines, polyimines, polyamides, amidoamines, dicyanamides, alcoholamines, anhydrides of carboxylic acids, carboxylic acids including dimers and trimers, and polyfunctional alcohols, to name a few. Some ethers can also be included with an epoxy resin, such as n-butyl glycidyl ether, 1,4 butanediol diglycidyl ether, and alkyl glycidyl ether. Further, a number of commercial products are available with two-part chemistries of an epoxy resin and an amine curing agent such as Stycast W19/Catalyst 9 from Emerson and Cummings; OG205 and 301 from Epo-Tek; Ren Infiltrant xi580 from Vantico; and DER 324 (epoxy resin), DER 732 (epoxy resin), DEH 29 (amine curing agent) and/or DEH 58 (amine curing agent) from Dow.

In an additional embodiment, the reactive build material may include a polyisocyanate and the curing agent may include a polyol for reacting with the polyisocyanate to form a setting composition of polyurethane. For example, the commercial product Synair Por-a-mold 2030 can be used to form a polyurethane setting composition to encapsulate a non-reactive powder in accordance with embodiments of the present system and method. In other embodiments the reactive build material can include isocyanate or polyisocyanate derivatives and the curing agent can include alcohols or polyols to form a setting composition.

In yet another exemplary embodiment, the reactive build material can include a functionalized silicone, such as an epoxy-functionalized silicone. The curing agent can include compositions having moieties reactive and a functionality of the functionalized silicone, and can include one or more of the curing agents described herein with respect to the epoxy reactive build materials. Alternatively, a silicone-based curing agent can also be used to react with NH and OH containing epoxies. Further, compositions having *—Si—O—* type backbones can be used, and can be configured to have better flexibility than the compositions based on *—C—* bonds.

In yet another embodiment, the reactive build material can include prepolymers with unsaturated functionality and the curing agent can include free-radical cure curing agents such as alkyl- or aryl-peroxides or hydroperoxides. Examples of prepolymers that are unsaturated include acrylates, multifunctional acrylates, urethane acrylates, epoxy acrylates, and silicone acrylates. Examples of curing agents can include peroxide initiators such as methyl ethyl ketone peroxide, benzoyl peroxide, acetylacetone peroxide, cumene hydroperoxide and the like. A solution of promoters such as aromatic amines and transition metal salts at lower oxidation states can be used to generate radicals in free-radical curing agents. Examples of aromatic amines that can be used include dimethylaniline, diethylaniline, dimethylacetamide, and the like. Examples of transition metal salts that can be used include cobalt naphthenate or cobalt octoate. Amine promoters can also be used in conjunction with cobalt promoters in conjunction with certain peroxide initiators like methyl ethyl ketone peroxide, particularly when rapid curing is desirable. This embodiment can form a setting composition by free-radical polymerization of unsaturated pre-polymers. There are a few concepts to consider when using free-radial initiators. Free-radical initiators such as peroxides, and promoters such as amines and metal salts, should not be in the same phase before jetting, as they would react immediately upon mixing. As such, in one embodiment, the promoters can be allocated in the build material phase (unsaturated pre-polymer), and the peroxide can be jetted as the curing agent.

Two-Part UV Curable Resin

One alternative to the two-part reactive resin is to incorporate a two-part UV curable resin into the system and method illustrated above. As mentioned above, the two components of a two-part UV curable material may include, but are in no way limited to, UV initiators and build materials.

According to one exemplary embodiment, the UV initiator can be dissolved in one or more solvents, such as, but not limited to, inert volatile solvents such as aliphatic and aromatic hydrocarbons of lower molecular weight, volatile alcohols, ethers, and esters, and high boiling point plasticizers (e.g., dibutyl phthalate). It's highly desirable that the solvent either evaporates quickly (within time necessary to deposit a few layers or is non-volatile enough to stay indefinitely long within the cured two-part radiation material). In the embodiment described directly above, the volume of the radiation initiator relative to the volume of the build material dispensed onto the build platform 20 should be about 1 part radiation initiator to 100 parts of the build material, although in some embodiments it may be 1 part of the radiation initiator to 10 parts of the build material, while in still others it may be 1 part of the radiation initiator to 1 part of the build material.

According to alternative embodiments, the radiation initiator can be dissolved in a solvent such as, but not limited to, low reactivity monomers/low viscosity monomers, such as low molecular weight monofunctional alkyl acrylates and alkyl methacrylates (e.g., allyl methacrylate, isodecyl acrylate and methacrylate, isooctyl acrylate), hydroxyalkyl acrylates and methacrylates (e.g., 2-hydroxyethyl methacrylate), glycidyl methacrylate, isobornyl acrylate, and the like. In particular, monofunctional monomer solvents are preferred to dissolve the radiation initiator, because monofunctional monomers in many cases provide better stability than di- and tri-functional monomers and are less likely to cross-link. In addition, low viscosity monomers are preferred as solvents for radiation initiators so that the mixture can be dispensed at a lower temperature. In these embodiments, the solvent participates in the polymerization reaction and becomes part of the multi-part radiation curable material. In the embodiment described directly above, the volume of the radiation initiator relative to the volume of the build material dispensed onto the build support 20 should be about 10 to 100 parts of the radiation initiator to about 100 parts of the build material, while in others it may be about 50 parts of the radiation initiator to 100 parts of the build material. In general, the radiation initiator and the build material have the characteristic that the chemical has a viscosity (i.e., a jettable viscosity) less than 70 cps at a temperature below about 200° C. and preferably less than 20 cps at a temperature below about 100° C. In addition, the radiation initiator and the build material should be able to react to form a "tack free" layer within about 5 seconds to 10 minutes at a temperature below about 100° C. Preferably, the radiation initiator and the build material should be able to react to form a "tack free" layer within about 5 seconds to 1 minute at a temperature below about 60° C. The term "tack free" is defined as the point where the crosslinking/chain growth reaction has progressed such that the resulting material is no longer tacky to the touch. It does not imply that curing/chain growth is complete.

In general, the radiation initiator and/or the build material can include additional chemical components such as, but not limited to, colorants (e.g., dyes, pigments, inks), dispersants, and catalysts to optimize the reaction time of the multi-part radiation curable material to obtain the proper balance of cure rate and layer-to-layer adhesion. The UV initiator can include chemicals such as, but not limited to, a free radical initiator, a cationic initiator, or combinations thereof. The free-radical initiator includes compounds that produce a free radical on exposure to UV radiation. The free-radical is capable of initiating a polymerization reaction. Exemplar free-radical initiators include, but are not limited to, benzophenones (e.g., benzophenone, methyl benzophenone, Michler's ketone, and xanthones), acylphosphine oxide type free radical initiators (e.g., 2,4,6-trimethylbenzolydiphenyl phosphine oxide (TMPO), 2,4,6-trimethylbenzoylethoxyphenyl phosphine oxide (TEPO), and bisacylphosphine oxides (BAPO's)), azo compounds (e.g., AIBN), benzoins and bezoin alkyl ethers (e.g., benzoin, benzoin methyl ether and benzoin isopropyl ether). The free-radical initiator can be used alone or in combination with a co-initiator. Co-initiators are used with initiators that need a second molecule to produce a radical that is active in UV-systems. For example, benzophenone uses a second molecule, such as an amine, to produce a reactive radical. A preferred class of co-initiators are alkanolamines such as, but not limited to, triethylamine, methyldiethanolamine and triethanolamine. Suitable cationic initiators include, but are not limited to, compounds that form aprotic acids or Bronstead acids upon exposure to UV light sufficient to initiate polymerization. The cationic initiator used may be a single compound, a mixture of two or more active compounds, or a combination of two or more different compounds (e.g., co-initiators). Exemplary cationic initiators include, but are not limited to, aryldiazonium salts, diaryliodonium salts, triarylsulphonium salts, and triarylselenium salts.

The UV build material can include compounds such as, but in no way limited to, acrylic compounds, compounds having one or more epoxy substituents, one or more vinyl ether substituents, vinylcaprolactam, vinylpyrolidone, urethanes, and combinations thereof. In particular, monomers of these compounds can be used as the build material. In addition, oligomers of these compounds, which may not have been considered previously because of their high viscosity, can be used as the build material. In this regard, the increased viscosity latitude allows us to start with higher molecular weight build materials, which may result in better mechanical properties (e.g., material stiffness/flexibility and strength, and resistance to impact) in the final three-dimensional object. One skilled in the art could select build materials that satisfy the desired mechanical properties of a particular application. Suitable acrylic compounds for the build material can include, but are not limited to, an acrylic monomer, an acrylic oligomer, an acrylic crosslinker, or combinations thereof. An acrylic monomer is a monofunctional acrylated molecule, which can be, for example, esters of acrylic acid and methacrylic acid. An acrylic oligomer (an oligomer is a short polymer chain) is an acrylated molecule, which can include, but is not limited to, polyesters of acrylic acid and methacrylic acid and a polyhydric alcohol (e.g., polyacrylates and polymethacylates of trimethylolpropane, pentaerythritol, ethylene glycol, propylene glycol). In addition, the acrylic oligomer can be a urethane-acrylate.

An acrylic crosslinker is a polyfunctional molecule, which provides enhanced crosslinking. Examples of acrylic crosslinkers includes, but is not limited to, 1,4-butanediol diacrylate, 1,4-butanediol>dimethacrylate, 1,6-hexamethylene glycol diacrylate, neopentyl glycol dimethacrylate, trimethylol propane trimethacrylate, pentaerythritol triacrylate, penta-erythritol trimethacrylate triethylene glycol triacrylate, triethylene glycol trimethacrylate, urethane acrylate, trimethylol propane triacrylate, and urethane methacrylates.

The build material can also be a chemical having one or more vinyl ether substituents such as, but not limited to, vinyl ether monomers and oligomers having at least one vinyl ether group. Exemplary vinyl ethers include, but are not limited to, ethyl vinyl ether, propyl vinyl ether, isobutyl vinyl ether, cyclohexyl vinyl ether, 2-ethylhexyl vinyl ether, butyl vinyl ether, ethyleneglocol monovinyl ether, diethyleneglycol divinyl ether, butane diol divinyl ether, hexane diol divinyl ether, cyclohexane dimethanol monovinyl ether, and 1,4 cyclohexane dimethanol divinyl.

The build material can also include chemicals having one or more epoxy substituents such as, but not limited to, epoxy monomers and oligomers having at least one oxirane moiety. Examples of epoxy-containing build materials include, but are not limited to, bis-(3,4 cyclohexylmethyl), 3,4-epoxy cyclohexylmethyl, 3,4-epoxycyclohexyl carboxylate, diglycidyl ether vinylcyclohexene, 1,2 epoxy-4-vinylcyclohexane, 2,4-epoxy cyclohexylmethyl, 3,4-epoxy cyclohexane carboxylate, and the like. Preferably, the build material includes chemicals such as, but not limited to, acrylates and derivatives thereof, epoxy acrylates and derivatives thereof, urethane acrylates and derivatives thereof, and combinations thereof. In addition, the build material can include materials, which otherwise may be excluded from solid freeform fabrication processes using ink-jet technologies because of high viscosity at room temperature. These build materials can include, but are not limited to, ethoxylated acrylates, methacrylates (e.g., ethoxylated nonyl phenol acrylate, which has a viscosity of about 100 cps at 25° C. (Sartomer Inc., SR504), ethoxylated nonyl phenol ethacrylate, which has a viscosity of about 80 cps at 25° C. (Sartomer Inc., CD612), ethoxylated bisphenol dimethacrylate, which has a viscosity of about 400 cps at 25° C. (Sartomer Inc., SR480)), caprolactone acrylate, which has a viscosity of about 80 cps at 25° C. (Sartomer Inc., SR495), and the like. In addition, the build material can include high viscosity materials such as, but not limited to, monomers and oligomers such as: ethoxylated bisphenol-A dimethacrylate compounds (e.g., Sartomer Inc., SR348 (1082 cps at 25° C.), Sartomer Inc., SR9036 (610 cps at 25° C.), Sartomer Inc., CD541 (440 cps at 25° C.), Sartomer Inc., SR480 (410 cps at 25° C.), and Sartomer Inc., CD540 (555 cps at 25° C.)), ethoxylated bisphenol-A diacrylates compounds (e.g., Sartomer Inc., SR601 (1080 cps at 25° C.), Sartomer Inc., SR602 (610 cps at 25° C.), CD9038 (680 cps at 25° C.), and Sartomer Inc., SR349 (1600 cps at 25° C.)), pentaerythrol triacrylate compounds (e.g., Sartomer Inc., SR344 (520 cps at 25° C.)), and ethoxylated trimethylolpropane triacrylate compounds (e.g., Sartomer Inc., SR415 (225–520 cps at 25° C.)).

The visible radiation initiator can include but not limited to α-diketones (such as camphorquinone, 1,2-Acenaphthylenedione, 1H-Indole-2,3-dione, 5H-Dibenzo[a,d]cycloheptene-10,11-dione), phenoxazine dyes (Resazurin, Resorufin), acylphosphine oxides such as diphenyl(2,4,6-trimethylbenzoyl)phosphine oxide, etc.

In conclusion, the present solid freeform fabrication system and method effectively allow for the rapid production of three dimensional objects while maintaining a high degree of dimensional accuracy. More specifically, the present system and method permit the deposition of a one-part or a two-part reactive resin in a non-reactive bulk spread powder to form a desired three-dimensional object. The combination of a reactive resin and a non-reactive powder contains the reaction to the liquid resin portion. As a result, the three-dimensional object produced will have better mechanical properties than would have been produced by traditional methods because containment of the reaction prevents swelling, dissolution, and re-deposition. Consequently, dimensional accuracy of the formed object is also improved. Moreover, the present method and system may quickly produce a three-dimensional object by providing the powder in bulk, while eliminating the need to form support structures. Cost of the solid freeform fabrication system may also be reduced by the present system and method because by only depositing a single resin into the non-reactive powder the complexity of the solid freeform fabrication system design may be reduced.

The preceding description has been presented only to illustrate and describe exemplary embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A method for creating a three-dimensional solid freeform fabrication object with non-reactive powder comprising:
   spreading a non-reactive powder on a substrate;
   heating a reactive resin to a temperature of about 40 to 200 degrees Celsius (C);
   selectively dispensing said heated reactive resin onto said non-reactive powder, forming a mixture of reactive resin and non-reactive powder, wherein said mixture defines said three-dimensional object; and
   curing said reactive resin thereby encapsulating said non-reactive powder.

2. The method of claim 1, wherein said reactive resin comprises an ultraviolet (UV) curable resin.

3. The method of claim 1, further comprising dispensing said heated reactive resin directly onto said non-reactive powder on said substrate.

4. The method of claim 1, further comprising applying ultrasonic energy to said mixture of reactive resin and non-reactive powder.

5. The method of claim 1, wherein curing said reactive resin further comprises:
   partially curing said reactive resin;
   applying at least one other layer of non-reactive powder and selectively dispensed reactive resin; and
   fully curing said reactive resin after said at least one other layer is formed to promote adhesion between layers of said object.

6. A solid freeform fabrication system for producing a three-dimensional object using non-reactive powder comprising:
   a powder spreading system configured to spread a specified quantity of non-reactive powder to form a layer of said powder on a substrate;
   a dispensing system adapted to selectively dispense both components of a two-part reactive resin onto said layer of non-reactive powder; and
   a computing device coupled to and configured to control said dispensing system and said powder spreading system;
   wherein said dispensing system comprises an inkjet dispenser.

7. The solid freeform fabrication system of claim 6, wherein said inkjet dispenser comprises one of a thermal inkjet dispenser, a continuous inkjet dispenser, or a piezoelectric inkjet dispenser.

8. The solid freeform fabrication system of claim 6, wherein said inkjet dispenser comprises a plurality of ejection orifices configured to selectively eject both components of said two-part reactive resin.

9. A solid freeform fabrication system for producing a three-dimensional object using non-reactive powder comprising:
   spreading means for spreading successive layers of said non-reactive powder;
   dispensing means for dispensing a reactive resin onto said non-reactive powder;
   curing means for curing said reactive resin, wherein said curing means only partially cures a layer of reactive resin until at least one additional layer of non-reactive powder and selectively-dispensed reactive resin have been formed, said reactive resin then being fully cured so as to promote adhesion between layers of said object; and
   controlling means for controlling said spreading means, said dispensing means, and said curing means.

10. The solid freeform fabrication system of claim 9, wherein said spreading means comprises one of a blade or a mechanical roller.

11. The solid freeform fabrication system of claim 9, wherein said dispensing means comprises a thermal inkjet dispenser.

12. The solid freeform fabrication system of claim 9, wherein said dispensing means comprises one of a piezoelectric inkjet dispenser or a continuous inkjet dispenser.

13. The solid freeform fabrication system of claim 9, wherein said curing means comprises a heater.

14. The solid freeform fabrication system of claim 9, wherein said curing means comprises a UV radiation applicator.

15. The solid freeform fabrication system of claim 9, wherein said controlling means comprises a computer.

16. A method for creating three-dimensional solid freeform fabrication object with non-reactive powder comprising:
    spreading a non-reactive powder on a substrate;
    selectively dispensing a reactive resin onto said non-reactive powder, forming a mixture of reactive resin and non-reactive powder, wherein said mixture defines said three-dimensional object;
    applying ultrasonic energy to said mixture of reactive resin and non-reactive powder; and
    curing said reactive resin thereby encapsulating said non-reactive powder;
    wherein curing said reactive resin further comprises:
        partially curing said reactive resin;
        applying at least one other layer of non-reactive powder and selectively-dispensed reactive resin; and
        fully curing said reactive resin after said at least one other layer is formed to promote adhesion between layers of said object.

17. A method for creating a three-dimensional solid freeform fabrication object with non-reactive powder comprising:
    spreading a non-reactive powder on a substrate;
    selectively dispensing a reactive resin onto said non-reactive powder, forming a mixture of reactive resin and non-reactive powder, wherein said mixture defines said three-dimensional object;
    partially curing said reactive resin;
    applying at least one other layer of non-reactive powder and selectively-dispensed reactive resin; and
    fully curing said reactive resin after said at least one other layer is formed to promote adhesion between layers of said object.

18. A system for fabricating a three-dimensional solid freeform fabrication object with non-reactive powder comprising:
    a system for spreading a non-reactive powder on a substrate;
    an inkjet dispenser for selectively dispensing a reactive resin onto said non-reactive powder, forming a mixture of reactive resin and non-reactive powder, wherein said mixture defines said three-dimensional object; and
    a curing system for curing said reactive resin thereby encapsulating said non-reactive powder.

19. The system of claim 18, wherein said curing system comprises an ultraviolet light source.

20. The system of claim 18, further comprising a system for applying ultrasonic energy to said mixture prior to curing.

* * * * *

UNITED STATES PATENT AND TRADEMARK OFFICE
CERTIFICATE OF CORRECTION

PATENT NO.         : 7,120,512 B2                                      Page 1 of 1
APPLICATION NO. : 10/648122
DATED                : October 10, 2006
INVENTOR(S)       : Laura Kramer et al.

It is certified that error appears in the above-identified patent and that said Letters Patent is hereby corrected as shown below:

On the face page, in field (54), in column 1, in "Title", line 2, delete "FABRICATING" and insert -- FABRICATION --, therefor.

In column 1, line 2, delete "FABRICATING" and insert -- FABRICATION --, therefor.

In column 15, line 37, in Claim 16, after "creating" insert -- a --.

In column 15, line 44, in Claim 16, delete "object:" and insert -- object; --, therefor.

Signed and Sealed this

Fifth Day of May, 2009

JOHN DOLL
*Acting Director of the United States Patent and Trademark Office*